United States Patent [19]
Nishizawa et al.

[11] Patent Number: 4,791,157
[45] Date of Patent: Dec. 13, 1988

[54] POLYETHERAMIDE-IMIDE POLYMER COMPOSITION

[75] Inventors: Hiroshi Nishizawa, Kitaibaraki; Touichi Sakata, Katsuta; Yoshiyuki Mukoyama, Hitachi, all of Japan

[73] Assignee: Hitachi Chemical Co., Tokyo, Japan

[21] Appl. No.: 20,885

[22] Filed: Mar. 2, 1987

[30] Foreign Application Priority Data

Oct. 3, 1986 [JP] Japan ................................. 61-235889

[51] Int. Cl.$^4$ ............................................... C08K 5/15
[52] U.S. Cl. .................................... 524/108; 524/113; 524/360; 524/378
[58] Field of Search ................ 524/360, 378, 108, 113

[56] References Cited

U.S. PATENT DOCUMENTS

| 3,607,814 | 9/1971 | DiLeone | 524/360 |
| 4,107,355 | 8/1978 | Merchant et al. | 524/378 |
| 4,115,341 | 9/1978 | Boldebuck et al. | 524/378 |
| 4,186,122 | 1/1980 | Okada et al. | 524/378 |
| 4,454,276 | 6/1984 | Uda et al. | 524/360 |
| 4,485,140 | 11/1984 | Gannett et al. | 524/378 |
| 4,639,485 | 1/1987 | Frayer | 524/378 |

FOREIGN PATENT DOCUMENTS 0121070   7/1982   Japan ................................. 524/378

Primary Examiner—Joseph L. Schofer
Assistant Examiner—J. M. Reddick
Attorney, Agent, or Firm—Antonelli, Terry & Wands

[57] ABSTRACT

A polyetheramide-imide polymer composition comprising an aromatic polyetheramide-imide polymer obtained by reacting trimellitic acid or a derivative thereof with a special aromatic diamine having ether linkages, and an ether compound and/or an alicyclic ketone compound as a solvent is excellent in film-forming properties at low temperatures.

5 Claims, No Drawings

POLYETHERAMIDE-IMIDE POLYMER COMPOSITION

BACKGROUND OF THE INVENTION

This invention relates to a polyetheramide-imide polymer composition, more particularly to a polyetheramide-imide polymer composition excellent in film-forming properties at low temperatures.

In the fields of electrical insulating materials, coating compositions usable at high temperatures, films, etc., wherein heat resistance and solvent resistance are required, thermosetting resin compositions such as epoxy resin compositions, polyimide resin composition, etc. have only been used. But film-forming of these thermosetting resin compositions disadvantageously requires a curing reaction at high temperatures with heating or a curing reaction for a long period of time.

On the other hand, when a substrate cannot be heated at high temperatures while solvent resistance and heat resistance are required, it is almost impossible to use thermosetting resin compositions heretofore being known and almost no compositions can be used for such a purpose. Examples of such substrates are insulating substrates for circuits mounting various kinds of electronic parts, coatings of plastic vessels portions of which contact with an organic solvent, orientation controlling films used in liquid crystal display devices using plastic films as substrates and such substrates, and the like.

In order to solve such a problem, polyamide-imide polymers belonging to thermoplastic resins are expected to be a preferable material. But the polyamide-imide polymers dissolve in a high boiling-point nitrogen-containing polar solvent such as N,N-dimethylacetamide, N-methylpyrrolidone, or the like, but hardly dissolve in a usual low boiling-point organic solvent such as tetrahydrofuran, dioxane, cyclohexanone, or the like. Therefore, there is a limit in film-forming properties at low temperatures.

On the other hand, polyetheramide-imide polymers improved slightly in solubility in a usual low boiling-point organic solvent maintaining high heat resistance of aromatic polyimides and polymeric polyamides are disclosed in Japanese Patent Unexamined Publication No. 59-202259. But since these polymers contain a large amount of amide bonding units derived from aromatic dicarboxylic acids, it is necessary to co-use the above-mentioned high boiling-point nitrogen-containing polar solvent and it is difficult to make a solution by using only a usual low boiling-point organic solvent.

SUMMARY OF THE INVENTION

This invention provides a polyetheramide-imide polymer composition obtained by dissolving a specific polyetheramide-imide polymer in a low boiling-point usual organic solvent and being capable of film forming at low temperatures.

This invention provides a polyetheramide-imide polymer composition obtained by dissolving an aromatic polyetheramide-imide polymer in an ether compound and/or an alicyclic ketone compound, said aromatic polyetheramide-imide polymer having a reduced viscosity of 0.30 dl/g or more measured at 30° C. and being obtained by reacting trimellitic acid or a reactive acid derivative thereof with an aromatic diamine having ether linkages and represented by the formula:

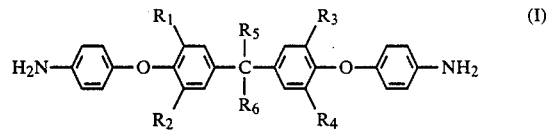

wherein $R_1$, $R_2$, $R_3$ and $R_4$ are independently a hydrogen atom, a lower alkyl group, a lower alkoxy group, a chlorine atom or a bromine atom; and $R_5$ and $R_6$ are independently a hydrogen atom, a methyl group, an ethyl group, a propyl group, a trifluoromethyl group or a trichloromethyl group.

DESCRIPTION OF THE PREFERRED EMBODIMENTS

The reactive acid derivative of trimellitic acid means an acid anhydride, halide, ester, amide, ammonium salt, etc. of trimellitic acid.

Examples of the reactive acid derivative of trimellitic acid are trimellitic anhydride, trimellitic anhydride monochloride, 1,4-dicarboxy-3-N,N-dimethylcarbamoylbenzene, 1,4-dicarboxy-3-carbophenoxybenzene, 1,4-dicarboxymethoxy-3-carboxybenzene, ammonium salts of trimellitic acid derived from trimellitic acid and ammonia, dimethylamine, triethylamine, or the like. Particularly, the use of trimellitic anhydride and trimellitic anhydride monochloride is preferable.

As the aromatic diamine having either linkages, there can be used a compound represented by the formula:

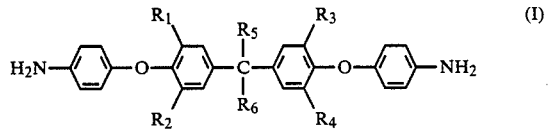

wherein $R_1$, $R_2$, $R_3$ and $R_4$ are independently a hydrogen atom, a lower alkyl group preferably having 1 to 6 carbon atoms, a lower alkoxy group preferably having 1 to 6 carbon atoms, a chlorine atom or a bromine atom; and $R_5$ and $R_6$ are independently a hydrogen atom, a methyl group, an ethyl group, a propyl group, a trifluoromethyl group or a trichloromethyl group.

Examples of the aromatic diaming of the formula (I) are 2,2-bis[4-(4-aminophenoxy)phenyl]propane, 2,2-bis[3-methyl-4-(4-aminophenoxy)phenyl]propane, 2,2-bis[3-bromo-4-(4-aminophenoxy)phenyl]propane, 2,2-bis[3-ethyl-4-(4-aminophenoxy)phenyl]propane, 2,2-bis[3-propyl-4-(4-aminophenoxy)phenyl]propane, 2,2-bis[3-isopropyl-4-(4-aminophenoxy)phenyl]propane, 2,2-bis[3-butyl-4-(4-aminophenoxy)phenyl]propane, 2,2-bis[3-sec-butyl-4-(4-aminophenoxy)phenyl]propane, 2,2-bis[3-methoxy-4-(4-aminophenoxy)phenyl]propane, 2,2-bis[3-ethoxy-4-(4-aminophenoxy)phenyl]propane, 2,2-bis[3,5-dimethyl-4-(4-aminophenoxy)phenyl]propane, 2,2-bis[3,5-dichloro-4-(4-aminophenoxy)phenyl]propane, 2,2-bis[3,5-dibromo-4-(4-aminophenoxy)phenyl]propane, 2,2-bis[3,5-dimethoxy-4-(4-aminophenoxy)phenyl]propane, 2,2-bis[3-chloro-4-(4-aminophenoxy)-5-methylphenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3-bromo-4-(4-aminophenoxy)phenyl]ethane, 1,1-bis[3-ethyl-4-(4-aminophenoxy)phenyl]ethane, 1,1-bis[3-propyl-4-(4-aminophenoxy)phenyl]ethane, 1,1-bis[3-isopropyl-4-(4-aminophenoxy)phenyl]ethane, 1,1-bis[3-butyl-4-(4-aminophenoxy)phenyl]ethane, 1,1-bis[3-sec-butyl-4-(4-aminophenoxy)phenyl]ethane, 1,1-bis[3-methoxy-4-(4-aminophenoxy)phenyl]ethane, 1,1-bis[3-ethoxy-4-(4-aminophenoxy)phenyl]ethane, 1,1-bis[3,5-dimethyl-4-(4-aminophenoxy)phenyl]ethane, 1,1-bis[3,5-dichloro-4-(4-aminophenoxy)phenyl]ethane, 1,1-bis[3,5-dibromo-4-(4-aminophenoxy)phenyl]ethane, 1,1-bis[3,5-dimethoxy-4-(4-aminophenoxy)phenyl]ethane, 1,1-bis[3-chloro-4-(4-aminophenoxy)-5-methylphenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3-bromo-4-(4-aminophenoxy)phenyl]methane, bis[3-ethyl-4-(4-aminophenoxy)phenyl]methane, bis[3-propyl-4-(4-aminophenoxy)phenyl]methane, bis[3-isopropyl-4-(4-aminophenoxy)phenyl]methane, bis[3-butyl-4-(4-aminophenoxy)phenyl]methane, bis[3-sec-butyl-4-(4-aminophenoxy)phenyl]methane, bis[3-methoxy-4-(4-aminophenoxy)phenyl]methane, bis[3-ethoxy-4-(4-aminophenoxy(phenyl]methane, bis[3,5-dimethyl-4-(4-aminophenoxy)phenyl]methane, bis[3,5-dichloro-4-(4-aminophenoxy)phenyl]methane, bis[3,5-dibromo-4-(4-aminophenoxy)phenyl]methane, bis[3,5-dimethoxy-4-(4-aminophenoxy)phenyl]methane, bis[3-chloro-4-(4-aminophenoxy)-5-methylphenyl]methane, 1,1,1,3,3,3-hexafluoro-2,2-bis[4-(4-aminophenoxy)phenyl]propane, 1,1,1,3,3,3-hexachloro-2,2-bis[4-(4-aminophenoxy)phenyl]propane, 3,3-bis[4-(4-aminophenoxy)phenyl]pentane, 1,1-bis[4-(4-aminophenoxy)phenyl]propane, 1,1,1,3,3,3-hexafluoro-2,2-bis[3,5-dimethyl-4-(4-aminophenoxy)phenyl]propane, 1,1,1,3,3,3-hexachloro-2,2-bis[3,5-dimethyl-4-(4-aminophenoxy)phenyl]propane, 3,3-bis[3,5-dimethyl-4-(4-aminophenoxy)phenyl]pentane, 1,1-bis[3,5-dimethyl-4-(4-aminophenoxy)phenyl]propane, 1,1,1,3,3,3-hexafluoro-2,2-bis[3,5-dibromo-4-(4-aminophenoxy)phenyl]propane, 1,1,1,3,3,3-hexachloro-2,2-bis[3,5-dibromo-4-(4-aminophenoxy)phenyl]propane, 3,3-bis[3,5-dibromo-4-(4-aminophenoxy)phenyl]pentane, 1,1-bis[3,5-dibromo-4-(4-aminophenoxy)phenyl]propane, 2,2-bis[4-(4-aminophenoxy)phenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1,1,3,3,3-hexafluoro-2,2-bis[3-methyl-4-(4-aminophenoxy)phenyl]propane, etc. Among them, 2,2-bis[4-(4-aminophenoxy)phenyl]propane is typical. If necessary, a mixture of the above-mentioned diamines can be used.

It is preferable to use trimellitic acid or a reactive acid derivative thereof in an amount of 90 to 130% by mole, more preferably 100% by mole or almost 100% by mole as a whole, based on the amount of the aromatic diamine of the formula (I).

The aromatic polyetheramide-imide polymer can be prepared by a solution polymerization method (disclosed, for example, in Japanese Patent Examined Publication Nos. 44-19274, 49-4077 and 42-15639, and Japanese Patent Unexamined Publication No. 57-14622), a precipitation polymerization method (disclosed, for example, in Japanese Patent Examined Publication No. 54-44719), a non-aqueous dispersion polymerization method (disclosed, for example, in U.S. Pat. No. 4,427,822), a melt polymerization method (discloses, for example, in Japanese Patent Examined Publication No. 40-8910), etc., by condensation polymerization of trimellitic acid or a reactive acid derivative thereof and an aromatic diamine of the formula (I). Considering the production cost, it is preferable to use a solution polymerization method wherein trimellitic acid anhydride and a diamine are condensation polymerized in the presence of a dehydration catalyst such as phosphoric acid, etc.

The polyetheramide-imide polymer is a polymer including linkage patterns, for example, of the following formulae (II) to (IV);

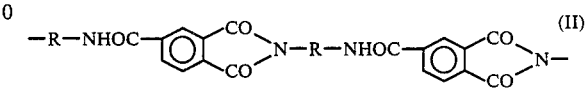

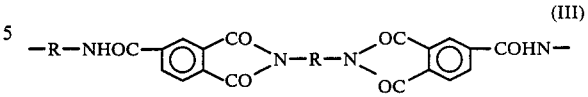

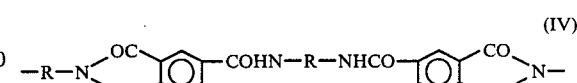

wherein R is a group of the formula:

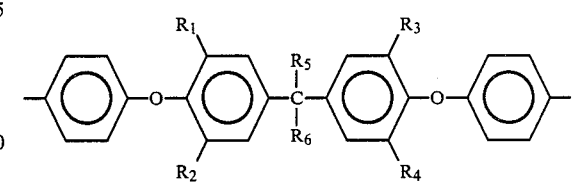

wherein $R_1$ through $R_6$ are as defined above (see the formula (I)).

If necessary, it is possible to co-use at least one other diamine such as 4,4'-diaminodiphenyl ether, 3,4'-diaminodiphenyl ether, 4,4'-diaminodiphenylmethane, 4,4'-diaminodiphenylsulfone, 4,4'-benzophenonediamine, meta-phenylenediamine, 4,4'-di(4-aminophenoxy)phenylsulfone, para-phenylene diamine, 4,4-di(3-aminophenoxy)phenylsulfone, 3,3'-diaminodiphenylsulfone, or a diamine of the formula:

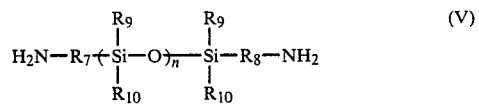

wherein $R_7$ and $R_8$ are independently a divalent hydrocarbon group, preferably an alkylene group having 1 to 5 carbon atoms, a phenylene group or an alkyl substituted phenylene group; $R_9$ and $R_{10}$ are independently a monovalent hydrocarbon group, preferably an alkyl group having 1 to 5 carbon atoms, a phenyl group or an alkyl substituted phenyl group; and n is an integer of 1 or more, preferably 1 to 100. Such a diamine can be used in an amount of 30% by mole or less based on the total amount of diamines used. When the amount is more than 30% by mole, undesirable effects appear on the solubility and the heat resistance of the polymer.

If necessary, it is possible to co-use as an acid component one or more tetrabasic acid dianhydrides such as pyromellitic dianhydride, 3,3',4,4'-benzophenonetetracarboxylic dianhydride, 3,3',4,4'-biphenyltetracarboxylic dianhydride, 2,2-bis[4-(2,3- or 3,4-dicarboxyphenoxy)phenyl]propane dianhydride, 1,1,1,3,3,3-hexafluoro-2,2-bis[4-(2,3- or 3,4-dicarboxyphenoxy)phenyl]- propane dianhydride, etc.; dicarboxylic acids such as terephthalic acid, isophthalic acid, phtharic acid, etc.; diimidodicarboxylic acids obtained by reacting a usual diaming as mentioned above with trimellitic acid or a reactive acid derivative thereof; and tetrabasic acid dianhydrides represented by the formula:

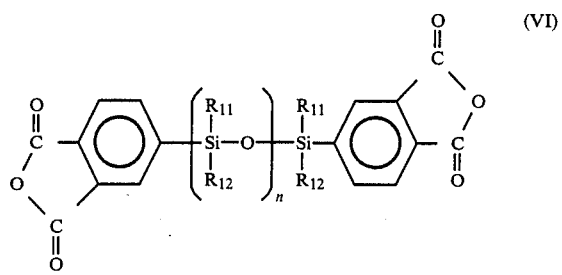

wherein $R_{11}$ and $R_{12}$ are independently a monovalent hydrocarbon group, preferably a lower alkyl group such as a methyl group; and g is an integer of 1 or more, preferably 1 or 2.

These tetrabasic acid dianhydrides, dicarboxylic acids and diimidodicarboxylic acids can be used in an amount of 30% by mole or less based on the total amount of the acid component. If the amount is more than 30% by mole, undesirable effects appear on the solubility and the heat resistance of the polymer.

It is preferable that the polyetheramide-imide polymer has a reduced viscosity of 0.30 dl/g or more. If the reduced viscosity is less than 0.30 dl/g, there is a tendency to lower the film-forming properties and mechanical properties.

The reduced viscosity is measured by using dimethylformamide as a solvent with a sample concentration of 0.5 g/dl at a temperature of 30° C.

The polyetheramide-imide polymer is used in a solid state containing substantially no solvent for the synthesis for the preparation of the composition of this invention. That is, the solid polyetheramide-imide polymer is dissolved in a solvent selected from the group consisting of ether compounds and alicyclic ketone compounds to yield the composition of this invention.

Examples of the ether compounds are tetrahydrofuran, dioxane, 1,2-dimethoxyethane, diethylene glycol dimethyl ether, triethylene glycol dimethyl ether, tetraethylene glycol dimethyl ether, etc. These ether compounds can be used alone or as a mixture thereof. Considering the boiling points, solubility and cost, the use of tetrahydrofuran, diethylene glycol dimethyl ether, or dioxane is preferable.

Examples of the alicyclic ketone compounds are cyclohexanone, 4-methylcyclohexanone, 2-cyclohexanone, 4-methyl-2-cyclohexene, etc. These alicyclic ketone compounds can be used alone or as a mixture thereof. Considering the boiling points, solubility and cost, the use of cyclohexanone is preferable.

The boiling points of these ether compounds and alicyclic ketone compounds are preferably lower than 180° C. considering the film-forming properties at low temperatures.

The polyetheramide-imide polymer composition of this invention may further contain one or more antioxidants, ultraviolet absorbers, pyrolysis preventing agents, pigments, plasticizers, lubricants, fillers, etc., in order to improve the heat resistance and the weather resistance.

The polyetheramide-imide polymer composition of this invention is useful as a overcoating agent for electronic parts, an adhesive, a film-forming material, and the like.

According to this invention, since a film can be formed only by evaporating the solvent after coating the polyetheramide-imide polymer composition on a substrate, the film-formation or the coating layer formation can be carried out at low temperatures and in a short time.

This invention is illustrated in detail by way of the following Examples, in which all percents are by weight unless otherwise specified.

EXAMPLE 1

(1)

Preparation of powdery polyetheramide-imide polymer

| Ingredients | Grams | Mole |
| --- | --- | --- |
| Trimellitic anhydride | 192.0 | 1.00 |
| 2,2-Bis[4-(4-aminophenoxy)phenyl]propane | 414.1 | 1.01 |
| N—Methylpyrrolidone | 606 | |
| Phosphoric acid aqueous solution (phosphoric acid content 85%) | 5.9 | 0.06 |

The above-mentioned ingredients were charged into a four-necked flask equipped with a thermometer, a stirrer, a nitrogen introducing pipe, and a quantitative analyzer for water, with stirring and the temperature was raised to 160° C. while passing a nitrogen gas. The temperature was gradually raised to 205° C., while removing the water distilled out of the system. The reaction was carried out at 205° to 210° C. The end point of the reaction was controlled by a Gardner viscosity and there was obtained a polyetheramide-imide polymer having a reduced viscosity of 0.41 dl/g (dimethylformamide, 0.5 g/dl at 30° C., the same conditions being used in the following Examples). The resulting polyetheramide-imide polymer solution was diluted with N-methylpyrrolidone so as to make the solid content about 25%. Then, the resulting solution was poured into water while strongly stirring with a mixer to recover solid polyetheramide-imide polymer. After washing the solid polymer with hot water, the solid polymer was boiled and washed with a large amount of water. After filtering, the obtained solid polymer was dried in a hot-air drier at 150° C. for 6 hours to give powdery polyetheramide-imide polymer.

(2)

Preparation of polyetheramide-imide polymer composition

The powdery polyetheramide-imide polymer obtained in the above step (1) in an amount of 15 g was dissolved in 85 g of a mixed solvent of tetrahydrofuran/cyclohexanone (weight ratio 6/4) to give a transparent, pale brown polyetheramide-imide polymer composition.

EXAMPLE 2

(1)

Preparation of powdery polyetheramide-imide polymer

The procedure of Example 1(1) was repeated except for changing the end point of the reaction to give powdery polyetheramide-imide polymer having a reduced viscosity of 0.69 dl/g.

(2)

Preparation of polyetheramide-imide polymer composition

The powdery polyetheramide-imide polymer obtained in the above step (1) in an amount of 15 g was dissolved in 85 g of dioxane to give a transparent, pale brown polyetheramide-imide polymer composition.

EXAMPLE 3

The powdery polyetheramide-imide polymer obtained in Example 2(1) in an amount of 15 g was dissolved in 85 g of tetrahydrofuran to give a transparent, pale brown polyetheramide-imide polymer composition.

COMPARATIVE EXAMPLE 1

| Ingredients | Grams | Mole |
| --- | --- | --- |
| Trimellitic anhydride | 192 | 1.0 |
| 4,4'-Diaminodiphenylmethane | 202 | 1.02 |
| Phosphoric acid aqueous solution (Phosphoric acid content 85%) | 6.92 | |
| N—methylpyrrolidone | 400 | |

The above-mentioned ingredients except for trimellitic anhydride were charged into a four-necked flask equipped with a thermometer, a stirrer, a nitrogen introducing pipe, and a quantitative analyzer for water, with stirring and the temperature was raised to 205° C. gradually with stirring while passing a nitrogen gas. After maintaining at that temperature for 1 hour, the flask was cooled to 175° C., and the trimellitic anhydride was added in about 10 minutes at that temperature. Then, the temperature was raised and the reaction was proceeded at 205° to 210° C. The water distilled after the addition of trimellitic anhydride was removed immediately out of the reaction system, and at the same time the N-methylpyrrolidone distilled was supplemented to proceed the reaction. The end point of the reaction was controlled by the Gardner viscosity to yield a polyamide-imide polymer having a reduced viscosity of 0.50 dl/g.

The solubility of the obtained polyamide-imide polymer was measured. The polyamide-imide was not dissolved in either tetrahydrofuran, dioxane, or cyclohexanone.

COMPARATIVE EXAMPLE 2

The powdery polyetheramide-imide polymer obtained in Example 2(1) in an amount of 15 g was dissolved in 85 g of N-methylpyrrolidone to give a transparent, brown polyetheramide-imide polymer composition.

COMPARATIVE EXAMPLE 3

(1)

Preparation of powder polyetheramide-imide polymer

The procedure of Example 1(1) was repeated except for changing the end point of the reaction to give powdery polyetheramide-imide polymer having a reduced viscosity of 0.25 dl/g.

(2)

Preparation of polyetheramide-imide polymer composition

The powdery polyetheramide-imide polymer obtained in the above step (1) in an amount of 15 g was dissolved in 85 g of dioxane to give a transparent, pale brown polyetheramide-imide polymer composition.

The composition was coated on a glass plate so as to make the thickness about 100 μm and baked at 200° C. for 30 minutes, and at 250° C. for 30 minutes. The resulting coating was brittle and did not form a film.

Using the compositions obtained in Examples 1 to 3 and Comparative Example 2, films (15–20 μm thick) were produced and subjected to the measuring of glass transition temperatures using a thermal physical tester TMS-1 (manufactured by Perkin-Elmer Corp.) with a load of 8 g and extension mood. The results are shown in Table 1.

TABLE 1

| Example No. | Film baking conditions | Glass transition temp. (°C.) |
| --- | --- | --- |
| Example 1 | 200° C. × 0.5 hr | 213 |
|  | 250° C. × 0.5 hr | 225 |
| Example 2 | 200° C. × 0.5 hr | 216 |
|  | 250° C. × 0.5 hr | 226 |
| Example 3 | 200° C. × 0.5 hr | 220 |
|  | 250° C. × 0.5 hr | 224 |
| Comparative Example 2 | 200° C. × 0.5 hr | 190 |
|  | 250° C. × 0.5 hr | 226 |

As is clear from Table 1, the composition of this invention obtained by dissolving the aromatic polyetheramide-imide polymer in a special low boiling-point solvent is excellent in film-forming properties at low temperatures compared with the composition of Comparative Example 2 using a polar solvent having a high boiling point. Thus, the composition of this invention is remarkably useful industrially.

What is claimed is:

1. A polyetheramide-imide polymer composition comprising an aromatic polyetheramide-imide polymer dissolved in a solvent selected from the group consisting of at least one ether compound, an alicyclic ketone compound and a mixture thereof, said aromatic polyetheramide-imide polymer having a reduced viscosity of 0.30 dl/g or more measured at 30° C. and being obtained by reacting trimellitic acid or a reactive acid derivative thereof with an aromatic diamine having ether linkages and represented by the formula:

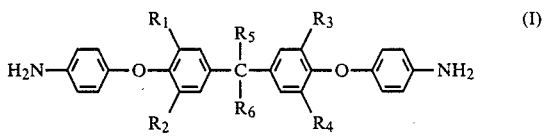
(I)

wherein $R_1$, $R_2$, $R_3$ and $R_4$ are independently a hydrogen atom, a lower alkyl group, a lower alkoxy group, a chlorine atom or a bromine atom; and $R_5$ and $R_6$ are independently a hydrogen atom, a methyl group, an ethyl group, a propyl group, a trifluoromethyl group or a trichloromethyl group.

2. A composition according to claim 1, wherein the ether compound and the alicyclic ketone compound have a boiling point of lower than 180° C.

3. A composition according to claim 1, wherein the ether compound is tetrahydrofuran, diethylene glycol dimethyl ether or dioxane alone or as a mixture thereof.

4. A composition according to claim 1, wherein the alicyclic ketone compound is cyclohexanone.

5. A composition according to claim 1, wherein said aromatic polyetheramide-imide polymer has a reduced viscosity of 0.30 dl/g or more measured at 30° C. in dimethylformamide in a sample concentration of 0.5 g/dl.

* * * * *